United States Patent
Wu

(10) Patent No.: US 10,084,599 B2
(45) Date of Patent: *Sep. 25, 2018

(54) DECRYPTION DEVICE, METHOD, AND CIRCUIT

(71) Applicant: Realtek Semiconductor Corporation, Hsinchu (TW)

(72) Inventor: Tzung-Juei Wu, Taipei (TW)

(73) Assignee: Realtek Semiconductor Corporation, Hsinchu (TW)

( * ) Notice: Subject to any disclaimer, the term of this patent is extended or adjusted under 35 U.S.C. 154(b) by 200 days.

This patent is subject to a terminal disclaimer.

(21) Appl. No.: 15/088,149

(22) Filed: Apr. 1, 2016

(65) Prior Publication Data

US 2017/0099142 A1 Apr. 6, 2017

(30) Foreign Application Priority Data

Oct. 6, 2015 (TW) .............................. 104132890 A

(51) Int. Cl.
*H04L 9/00* (2006.01)
*H04L 9/30* (2006.01)
*H04L 9/08* (2006.01)

(52) U.S. Cl.
CPC ............ *H04L 9/3066* (2013.01); *H04L 9/002* (2013.01); *H04L 9/0838* (2013.01); *H04L 9/302* (2013.01); *H04L 2209/24* (2013.01)

(58) Field of Classification Search
CPC ..... G06F 2207/7261; G06F 2207/7271; G06F 7/723; G06F 7/725; H04L 9/004; H04L 9/005; H04L 9/302

USPC ....................... 380/28, 30; 708/164; 713/187
See application file for complete search history.

(56) References Cited

U.S. PATENT DOCUMENTS

| | | | | |
|---|---|---|---|---|
| 6,748,410 B1* | 6/2004 | Gressel | ................... | G06F 7/728 708/491 |
| 7,269,261 B1* | 9/2007 | Jennings | ............... | H04L 9/0894 380/286 |
| 2009/0180610 A1* | 7/2009 | Tobergte | ................. | G06F 7/723 380/28 |
| 2009/0228717 A1* | 9/2009 | Futa | ........................ | G06F 21/14 713/190 |
| 2010/0064142 A1* | 3/2010 | Matsuzaki | .............. | G06F 7/728 713/189 |
| 2010/0257318 A1 | 10/2010 | Aciicmez et al. | | |
| 2011/0194694 A1* | 8/2011 | Struik | ................... | H04L 9/3252 380/255 |
| 2012/0221618 A1* | 8/2012 | Feix | ...................... | G06F 7/5235 708/524 |
| 2013/0016828 A1* | 1/2013 | Teglia | ..................... | G06F 7/723 380/28 |

(Continued)

FOREIGN PATENT DOCUMENTS

CN 101292274 A 10/2008

*Primary Examiner* — Gary S Gracia
(74) *Attorney, Agent, or Firm* — CKC & Partners Co., Ltd.

(57) ABSTRACT

A decryption method includes receiving encrypted data, in which the encrypted data is encrypted by an RSA public key; and performing at least one multiplication operation and at least one square operation according to an RSA private key and the encrypted data to acquire decrypted data. A false square operation is performed in performing one of the at least one multiplication operation, or a false multiplication operation is performed in performing one of the at least one square operation.

20 Claims, 7 Drawing Sheets

(56) References Cited

U.S. PATENT DOCUMENTS

2014/0129604 A1\* 5/2014 Clavier .................. G06F 17/10
                                                               708/606
2014/0281573 A1\* 9/2014 Jaffe ...................... G06F 21/72
                                                               713/189
2017/0099142 A1\* 4/2017 Wu ....................... H04L 9/0838

\* cited by examiner

DECRYPTION DEVICE, METHOD, AND CIRCUIT

RELATED APPLICATIONS

This application claims priority to Taiwanese Application Serial Number 104132890 filed Oct. 6, 2015, which is herein incorporated by reference.

BACKGROUND

Technical Field

The present disclosure relates to a device, a method and a circuit. More particularly, the present disclosure relates to a decryption device, a decryption method, and a circuit.

Description of Related Art

An RSA encryption algorithm is an asymmetric encryption algorithm. An encryption device can use an RSA public key to encrypt a message. After the encrypted message is received by the decryption device, the decryption device can use an RSA private key to decrypt the encrypted message.

However, when the decryption device performs the decryption, an attacker may measure a relevant signal (e.g., a voltage or power) of the decryption device to determine the operation performed by the decryption device, so as to acquire the RSA private key used in the decryption device.

Therefore, a decryption method capable of defending against sideband attacks is desired.

SUMMARY

One aspect of the present disclosure is related to a decryption method. The decryption method includes receiving encrypted data, in which the encrypted data is encrypted by an RSA public key, and performing at least one multiplication operation and at least one square operation according to an RSA private key and the encrypted data to acquire decrypted data. A first false square operation is performed in performing one of the at least one multiplication operation, or a first false multiplication operation is performed in performing one of the at least one square operation.

Another aspect of the present disclosure relates to a decryption device. The decryption device includes a communication module and a decryption component. The decryption component is configured for receiving, through the communication module, encrypted data, in which the encrypted data is encrypted by an RSA public key, and performing at least one multiplication operation and at least one square operation according to an RSA private key and the encrypted data to acquire decrypted data. A first false square operation is performed in performing one of the at least one multiplication operation, or a first false multiplication operation is performed in performing one of the at least one square operation.

Another aspect of the present disclosure is related to a decryption circuit. The decryption circuit includes a squarer, a multiplier, a multiplexer, and a register. The squarer receives an input value, and perform a square operation to the input value to generate an output of the squarer. The multiplier receives the input value and encrypted data, and performs a multiplication operation with the input value and the encrypted data to generate an output of the multiplier. The multiplexer receives the output of the squarer and the output of multiplier, and outputs one of the output of the squarer and the output of multiplier as a multiplexer output according to an RSA private key. The register temporarily stores the multiplexer output, and provides the multiplexer output to the squarer and the multiplier to serve as a new input value. The square operation and the multiplication operation are performed simultaneously.

DETAILED DESCRIPTION

Figure 1:
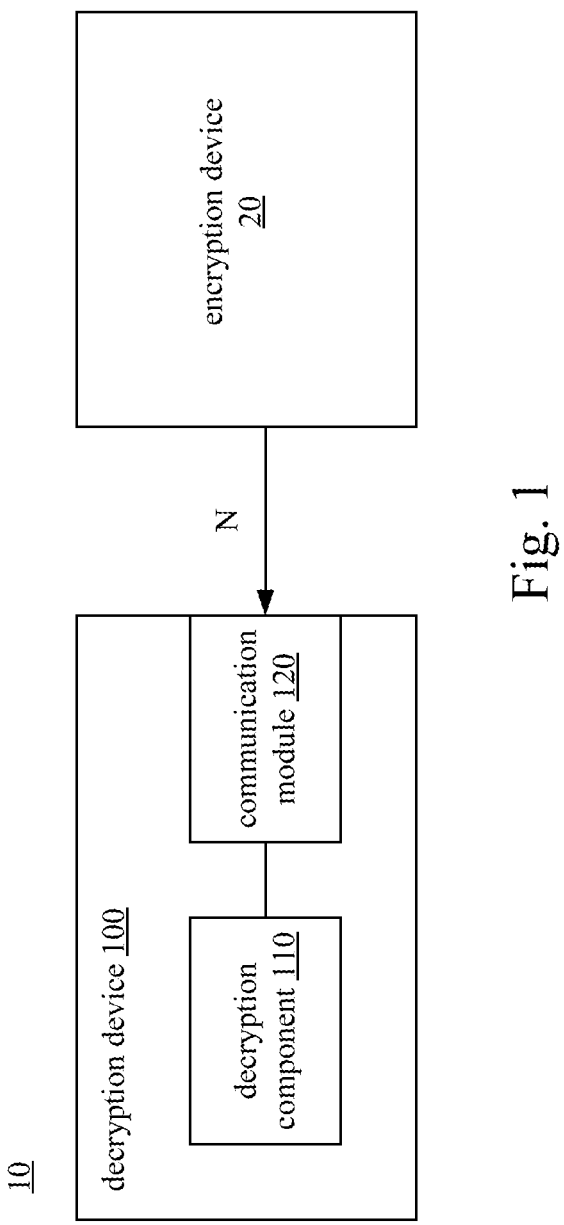
FIG. 1 is a schematic block diagram of a decryption system according to one embodiment of the present disclosure.

FIG. 1 is a schematic block diagram of a decryption system 10 according to one embodiment of the present disclosure. The decryption system 10 includes a decryption device 100 and an encryption device 20. The encryption device 20 is configured to use an RSA public key to encrypt a message so as to generate encrypted data N. The decryption device 100 is configured to receive the encrypted data N and decrypt the encrypted data N.

The decryption device 100 includes a decryption component 110 and a communication module 120 electrically connected to each other. The communication module 120 is configured to receive the encrypted data N from the encryption device 20 and to transmit the encrypted data N to the decryption component 110. The decryption component 110 is configured to decrypt the encrypted data N.

In one embodiment, the decryption component 110 can be realized by a central processor, a microprocessor, or another suitable calculating device performing specific commands or specific computer programs, or can be realized by a circuit. In one embodiment, the communication module 120 can be realized by a wired or wireless communication component.

Figure 2:
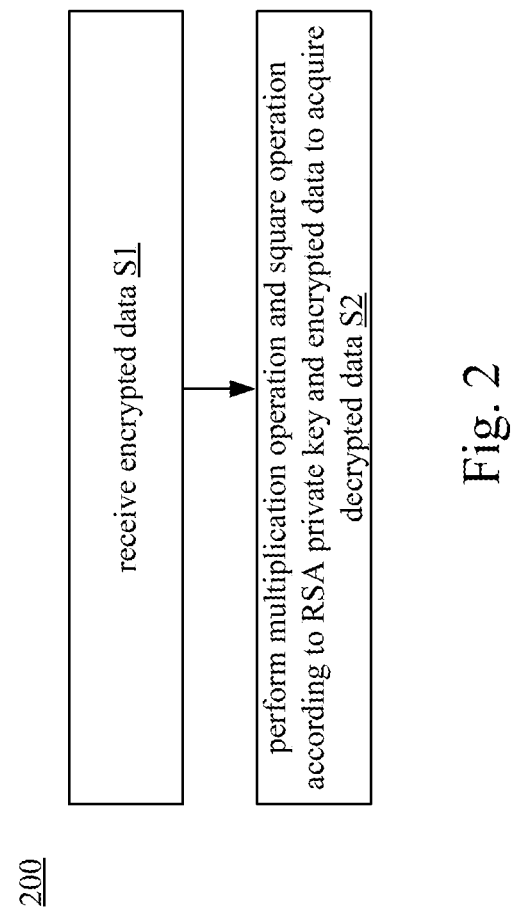
FIG. 2 is a flowchart of a decryption method according to one embodiment of the present disclosure.

Referring to FIG. 2, a decryption method 200 can be applied to a device having a structure that is the same as or similar to the decryption device 100 shown in FIG. 1. In the following paragraphs, the embodiment shown in FIG. 1 is used as an example to describe the decryption method 200 according to an embodiment of the present disclosure.

Step S1: The decryption component 110 receives encrypted data N from the encryption device 20 through the communication module 120. The encrypted data N is encrypted by an RSA public key.

Step S2: The decryption component 110 decrypts the encrypted data N. The decryption component 110 performs at least one multiplication operation and at least one square operation according to an RSA private key and the encrypted data N to decrypt the encrypted data N and acquire decrypted data, in which the RSA private key corresponds to the RSA public key.

A descriptive example is described with reference to Table 1. For this example, a value of the RSA private key is 123, and a binary form of the RSA private key is 2'1111011. In the decryption operation, a multiplication operation and/or a square operation are/is performed corresponding to each of the bits sequentially. Taking the sequence 2 in FIG. 3 as an example, in period T1, the decryption component 110 performs a square operation SQ. In periods T2 and T3, since a second bit from the left of the binary form of the RSA private key is 1, the decryption component 110 sequentially performs a multiplication operation MT and a square operation SQ. In period T8, since a fifth bit from the left of the binary form of the RSA private key is 0, the decryption component 110 performs a multiplication operation MT.

TABLE 1

| | binary form | | | | | | |
|---|---|---|---|---|---|---|---|
| | 1 | 1 | 1 | 1 | 0 | 1 | 1 |
| multiplication operation | — | ✓ | ✓ | ✓ | — | ✓ | ✓ |
| square operation | ✓ | ✓ | ✓ | ✓ | ✓ | ✓ | — |

In the decryption operation, the number of times that the multiplication operations are performed corresponds to the number of "1's" in the binary form of the RSA private key. For example, in Table 1, other than the first bit from the left, there are five "1's" in the binary form of the RSA private key, and therefore, the multiplication operations are performed five times in the decryption operation. In addition, in the decryption operation, the number of times that the square operations are performed corresponds to a binary bit length of the RSA private key. For example, since the binary bit length of the RSA private key is 7, the square operation is performed 7−1=6 times in the decryption operation.

It should be noted that, when a multiplication operation is performed, the decryption component 110 performs a first false square operation according to the encrypted data N at the same time. Also, when a square operation is performed, the decryption component 110 performs a first false multiplication operation according to the encrypted data N at the same time. The calculation result of the first false square operation or the calculation result of the first false multiplication operation is not used in generating the decrypted data. Since the first false square operation or the first false multiplication operation is performed concurrent with the multiplication operation or the square operation respectively, it is difficult for an attacker to acquire the operations in the decryption operation performed by the decryption device 100 and the corresponding RSA private key through measuring a relevant signal (e.g., power, current, voltage, temperature, frequency) of the decryption device 100.

In one embodiment, the number of times the first false multiplication operation is performed is equal to or less than the number of times the square operation is performed. Similarly, the number of times the first false square operation is performed is equal to or less than the number of times the multiplication operation is performed.

In the paragraphs below, an operative example is provided with reference to FIG. 3. In this operative example, the value of the RSA private key is 123, and a binary form of the RSA private key is 2'1111011. When the decryption component 110 performs a square operation SQ, a corresponding waveform of a relevant signal of the decryption device 100 has a characteristic value (e.g., amplitude) a1, and when the decryption component 110 performs a multiplication operation MT, a corresponding waveform of the relevant signal of the decryption device 100 has a characteristic value a2.

In addition, in this operative example, when the decryption component 110 sequentially performs the operations in the operation sequence 2, the decryption component 110 also sequentially performs the first false multiplication operations MT' and first false square operations SQ' in the sequence 4, so that each of the square operations SQ and each of the first false multiplication operations MT' are performed concurrently, and each of the multiplication operations MT and each of the first false square operations SQ' are performed concurrently. When the decryption component 110 performs the first false square operation SQ', a corresponding waveform of a relevant signal of the decryption device 100 has the characteristic value a1, and when the decryption component 110 performs the first false multiplication operation MT', a corresponding waveform of the relevant signal of the decryption device 100 has the characteristic value a2.

Through such operations, in the decryption operation, even if an attacker measures the relevant signal of the decryption device 100, the attacker can only acquire the sequence 6 which is the result of summing relevant signals of the sequence 2 and the sequence 4, and it is therefore difficult to identify the RSA private key from such a measurement result.

In some embodiments of the present disclosure, before or after the at least one multiplication operation or the at least one square operation is performed, the decryption component 110 performs at least one second false square operation or at least one second false multiplication operation. The second false square operation and the second false multiplication operation are null operations, which are configured to be inserted before, between, or after the original operation sequence (e.g., the operation sequence 2 in FIG. 3), to confuse any attacker who might measure a relevant signal of the decryption device 100.

In one embodiment, the square operation or the second false square operation is performed between two of the second false multiplication operations, two of the multiplication operations, or one of the second false multiplication operations and one of the multiplication operations. In such a manner, presentation of an abnormal sequence after the second false multiplication operations and the second false square operations are inserted can be avoided, so as to prevent an attacker from acquiring additional information.

In the paragraphs below, an operative example is provided with reference to FIG. 4. In this operative example, the value of the RSA private key is 123, and a binary form of the RSA private key is 2'1111011. In the decryption operation, the decryption component 110 sequentially performs the square operation SQ, the multiplication operation MT, the second square operation SQ", and the second multiplication operation MT'". The calculation result of the second false square operation SQ" or the calculation result of the second false multiplication operation MT" is not used in generating the decrypted data. In such a manner, in the decryption operation, even if an attacker measures a relevant signal to acquire the operations in the operation sequence 8 performed by the decryption device 100, it is difficult for the attacker to identify the RSA private key.

Figure 5:
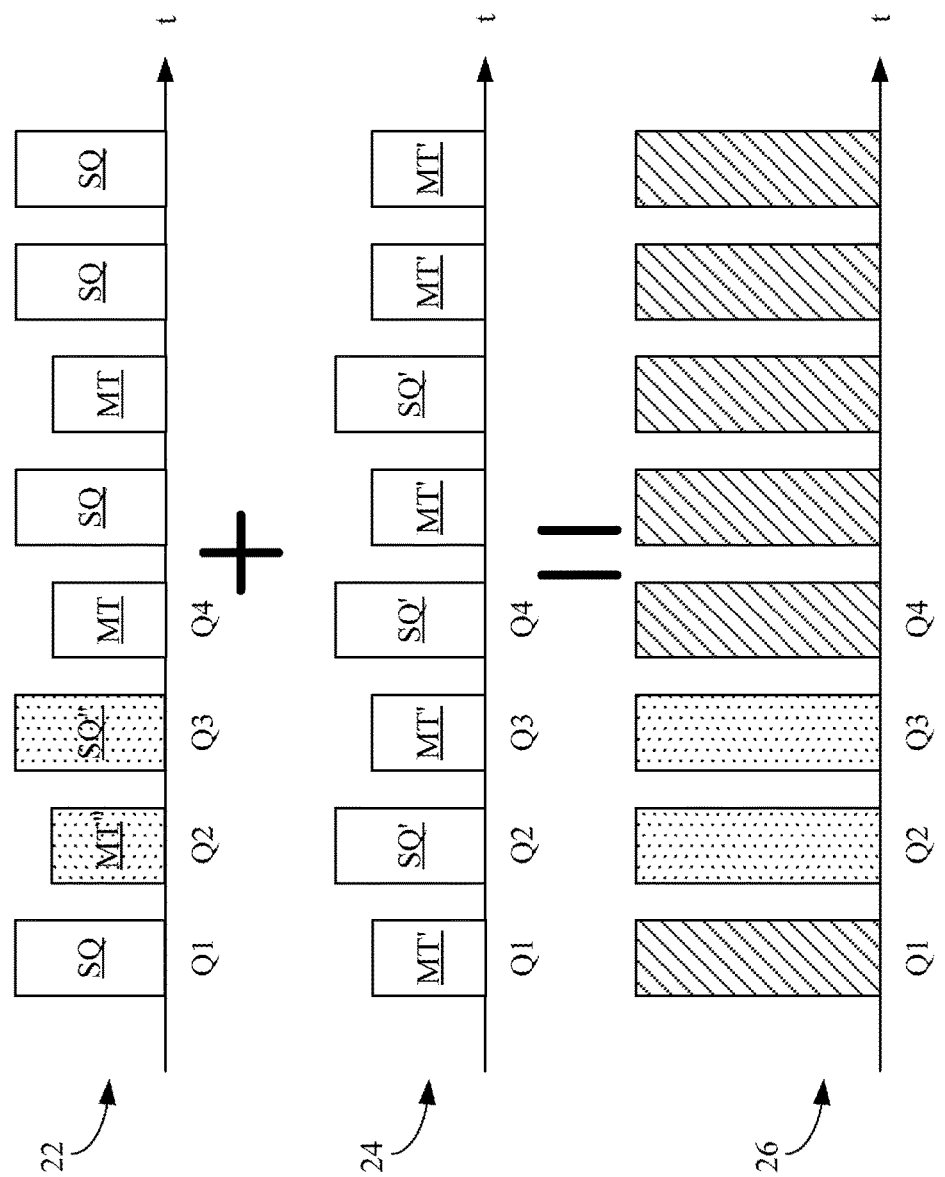
FIG. 5 illustrates an operative example of a decryption method according to one embodiment of the present disclosure.

Reference is made to FIG. 5. The decryption component 110 can perform the operation sequence 22 with the second false square operation SQ" and the second false multiplication operation MT'" inserted therein. In performing the operation sequence 22, the decryption component 110 also performs the operation sequence 24, so that one of the square operation SQ and the second false square operation SQ" is performed concurrent with the first false multiplication operation MT', and one of the multiplication operation MT and the second false multiplication operation MT" is performed concurrent with the first false square operation SQ'. In such a manner, in the decryption operation, it is difficult for the attacker to identify the RSA private key from the measured operation sequence 26.

Figure 6:
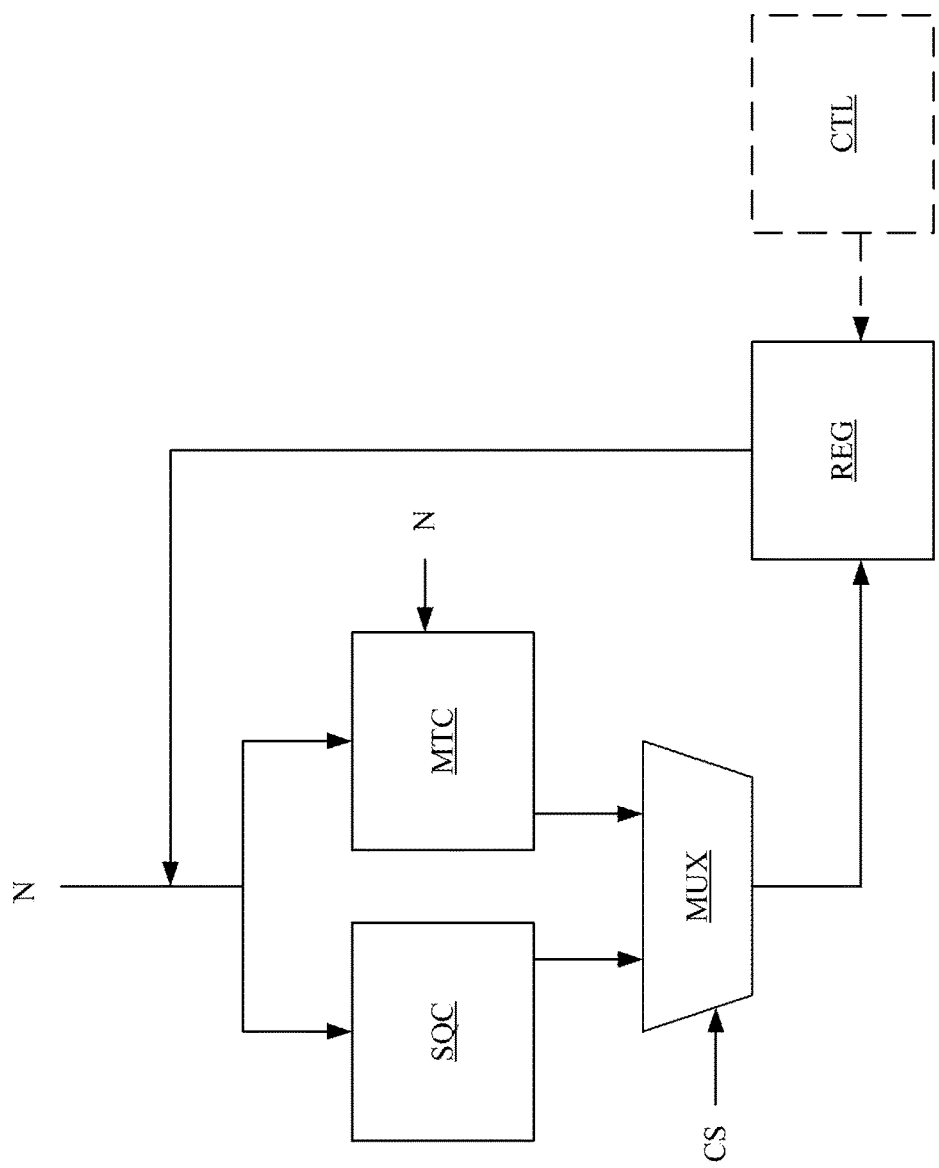
FIG. 6 is a schematic block diagram of a decryption circuit according to one embodiment of the present disclosure.

In one embodiment of the present disclosure, the decryption component 110 may include a decryption circuit, such as a decryption circuit 112 as shown in FIG. 6, for performing the decryption operation described above. As illustrated in FIG. 6, the decryption circuit 112 includes a squarer SQC, a multiplier MTC, a multiplexer MUX, and a register REG. The input end of the squarer SQC and the first input end of the multiplier MTC are electrically connected to the output end of the register REG and an input end of the encrypted data N. The second input end of the multiplier MTC is configured to receive the encrypted data N. The output end of the squarer SQC and the output end of the multiplier MTC are respectively and electrically connected to the first input end and the second input end of the multiplexer MUX. The control end of the multiplexer MUX is configured to receive a control signal CS, in which the control signal CS corresponds to the RSA private key. The output end of the multiplexer MUX is electrically connected to the input end of the register REG.

The squarer SQC performs a square operation to the input value so as to generate an output of the squarer, and the multiplier MTC performs a multiplication operation with the input value and the encrypted data N to generate an output of multiplier, in which the input value may be the encrypted data N or an output of the register REG. The multiplexer MUX outputs one of the output of the squarer and the output of multiplier as a multiplexer output according to the control signal CS. The register REG receives the multiplexer output, temporarily stores the multiplexer output, and provides the multiplexer output to the squarer SQC and the multiplier MTC to serve as a new input value.

In this embodiment, the square operation performed by the squarer SQC is performed concurrent with the multiplication operation performed by the multiplier MTC, so that it is difficult for an attacker to acquire the operations in the decryption operation performed by the decryption device 100 and the corresponding RSA private key through measuring a relevant signal of the decryption device 100.

Figure 3:
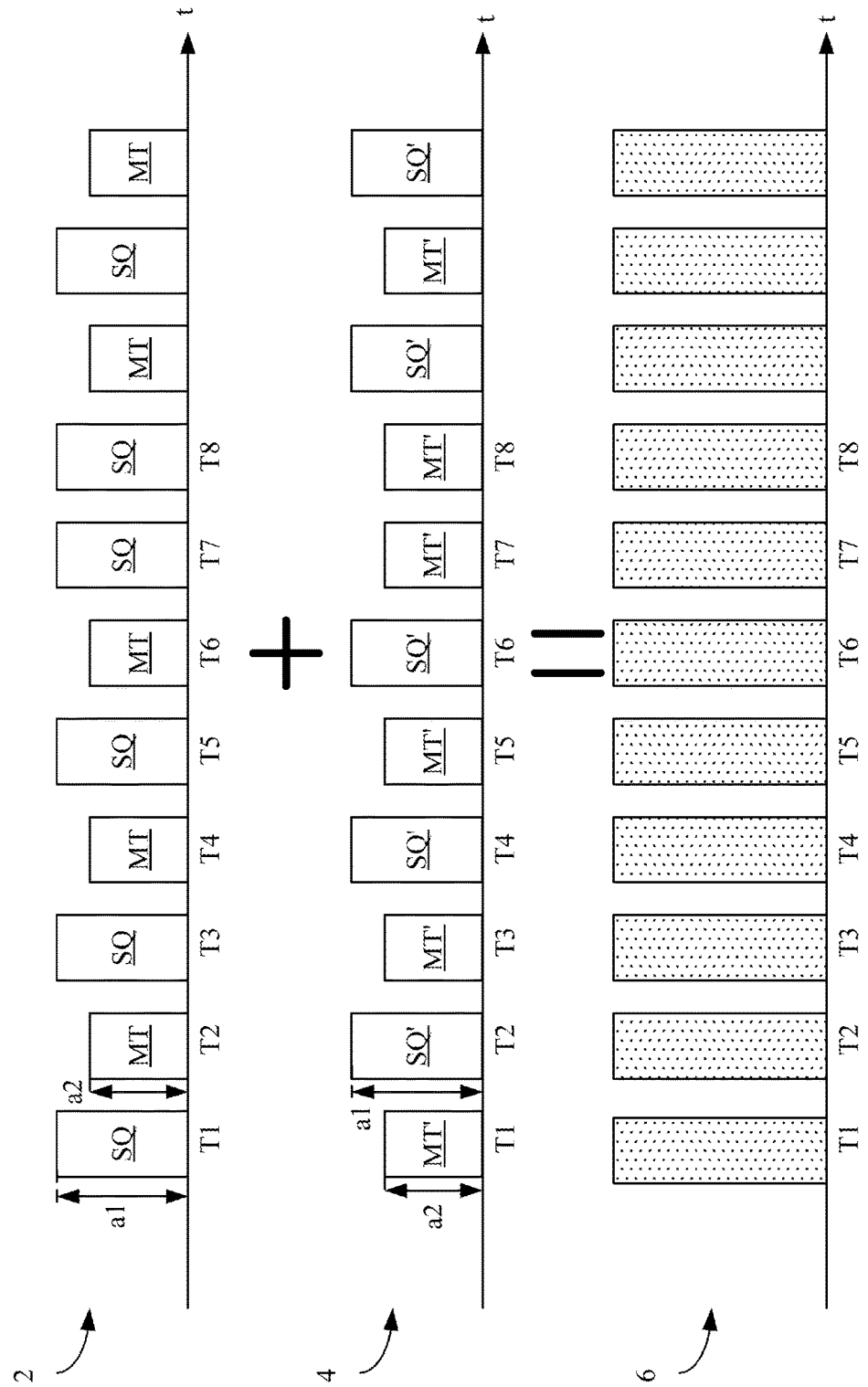
FIG. 3 illustrates an operative example of a decryption method according to one embodiment of the present disclosure.

For example, referring to both FIGS. 3 and 6, in period T1, both the input values of the squarer SQC and the multiplier MTC are N. The squarer SQC performs a square operation and outputs $N^2$. Concurrently, the multiplier MTC performs a multiplication operation and outputs $N^2$. The multiplexer MUX selects the output of the squarer as a first multiplexer output according to the control signal CS. The register REG temporarily stores the first multiplexer output and provides the first multiplexer output to the squarer SQC and the multiplier MTC in a next period.

In period T2, both the input values of the squarer SQC and the multiplier MTC are $N^2$. The squarer SQC performs a square operation and outputs NM. Concurrently, the multiplier MTC performs a multiplication operation and outputs $N^3$. The multiplexer MUX selects the output of multiplier (i.e., $N^3$) as a second multiplexer output according to the control signal CS. The register REG temporarily stores the second multiplexer output and provides the second multiplexer output to the squarer SQC and the multiplier MTC in a next period. The rest may be deduced by analogy.

By implementing the operations described above, it is difficult for an attacker to acquire the operations in the decryption operation performed by the decryption device 100 and the corresponding RSA private key through measuring a relevant signal of the decryption device 100.

In one embodiment, the decryption circuit 112 may further include a controller CTL (shown by the dashed line). The controller CTL is electrically connected to the register REG, and is configured for controlling the register REG to either provide or not provide the new multiplexer output to the squarer SQC and the multiplier MTC.

For example, in a first operating state, when the register REG receives a new multiplexer output, the controller CTL can control the register REG to maintain the original multiplexer output and provide the original multiplexer output to the squarer SQC and the multiplier MTC. In a second operating state, when the register REG receives a new multiplexer output, the controller CTL can control the register REG to temporarily store the new multiplexer output and provide the new multiplexer output to the squarer SQC and the multiplier MTC.

For instance, referring to both FIGS. 5 and 6, in period Q1, both the input values of the squarer SQC and of the multiplier MTC are N, and both of the squarer SQC and the multiplier MTC output $N^2$. The multiplexer MUX selects the output of the squarer as a first multiplexer output according to the control signal CS. The controller CTL controls the register REG to temporarily store the first multiplexer output, so that the register REG provides the first multiplexer output to the squarer SQC and the multiplier MTC in a next period.

In period Q2, both the input values of the squarer SQC and the multiplier MTC are $N^2$. The squarer SQC outputs $N^4$, and the multiplier MTC outputs $N^3$ concurrently. The multiplexer MUX selects the output of multiplier as a second multiplexer output according to the control signal CS. The controller CTL controls the register REG to maintain the first multiplexer output, so that the register REG provides the first multiplexer output to the squarer SQC and the multiplier MTC in a next period.

In period Q3, both the input values of the squarer SQC and the multiplier MTC are $N^2$. The squarer SQC outputs $N^4$, and the multiplier MTC outputs $N^3$ concurrently. The multiplexer MUX selects the output of the squarer as a third multiplexer output according to the control signal CS. The controller CTL controls the register REG to maintain the first multiplexer output, so that the register REG provides the first multiplexer output to the squarer SQC and the multiplier MTC in a next period.

In period Q4, both the input values of the squarer SQC and the multiplier MTC are $N^2$. The squarer SQC outputs $N^4$, and the multiplier MTC outputs $N^3$ concurrently. The multiplexer MUX selects the output of multiplier (i.e., $N^3$) as a fourth multiplexer output according to the control signal CS. The controller CTL controls the register REG to temporarily store the fourth multiplexer output, so that the register REG provides the fourth multiplexer output to the squarer SQC and the multiplier MTC in a next period to serve as a new input value.

As a result of the operations described above, it is difficult for an attacker to acquire the operations in the decryption operation performed by the decryption device 100 and the corresponding RSA private key through measuring a relevant signal of the decryption device 100.

Figure 7:
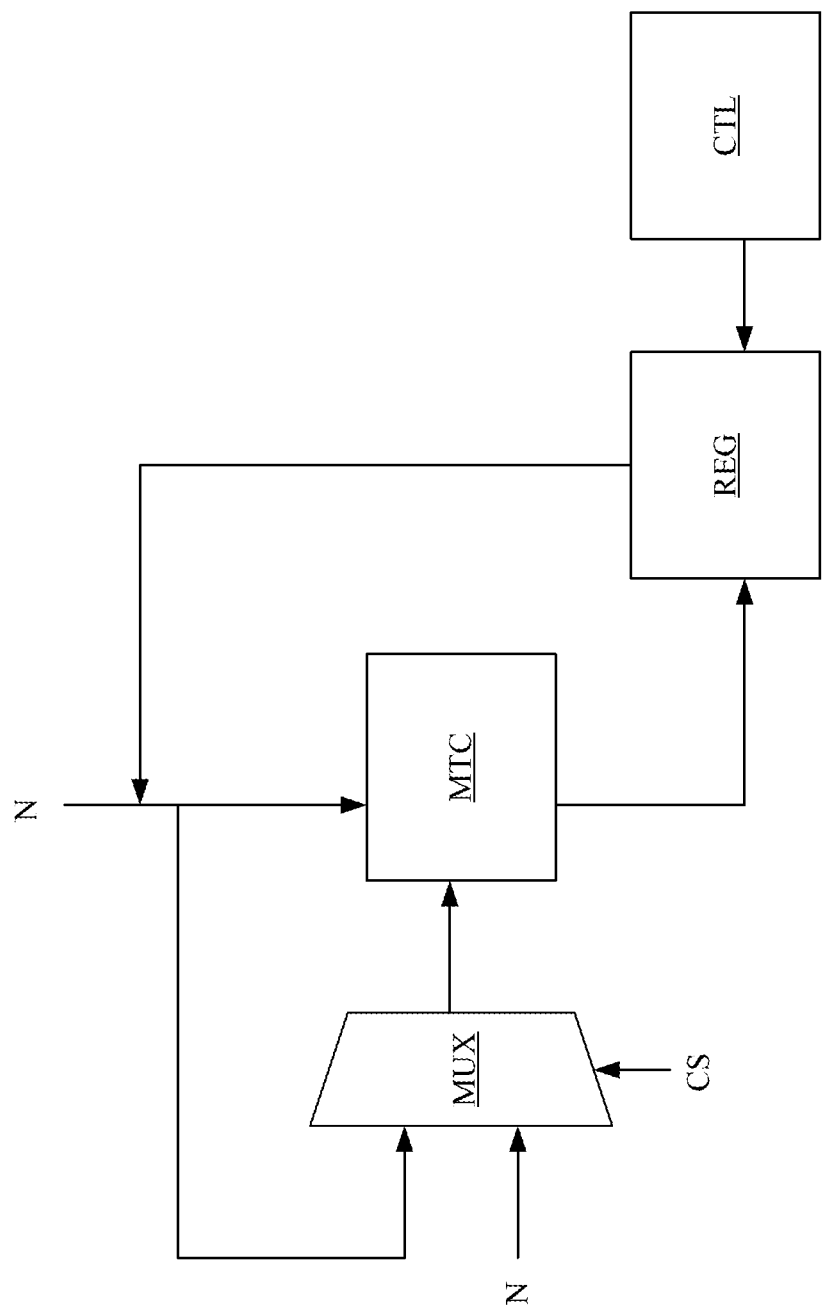
FIG. 7 is a schematic block diagram of a decryption circuit according to one embodiment of the present disclosure.

In an alternative embodiment of the present disclosure, the decryption component 110 may include a decryption circuit 114 as shown in FIG. 7 for performing the decryption operation described above. In the embodiment of FIG. 7, the decryption circuit 114 includes a multiplier MTC, a multiplexer MUX, a register REG, and a controller CTL. The first input end of the multiplexer MUX is electrically connected to the output end of the register REG and the input end of the encrypted data N. The second input end of the multiplexer MUX is configured to receive the encrypted data N. The control end of the multiplexer MUX is configured to receive a control signal CS. The output end of the multiplexer MUX is electrically connected to a first input end of the multiplier MTC. The second input end of the multiplier MTC is electrically connected to the output end of the register REG and the input end of the encrypted data N. The output end of the multiplier MTC is electrically connected to the register REG. The controller CTL is electrically connected to the register REG.

The multiplexer MUX is configured to output the received input value or the received encrypted data N according to the RSA private key (e.g., the control signal CS), in which the input value may be the encrypted data N or an output of the register REG. The multiplier MTC is configured to perform a multiplication operation with the input value and a multiplexer output (i.e., the output of the multiplexer MUX) to generate an output of multiplier. The register REG is configured to receive the output of multiplier, to temporarily store the output of multiplier, and to provide the output of multiplier to the multiplexer MUX and the multiplier MTC to serve as a new input value. The controller CTL is configured to control the register REG to provide or not provide the new output of multiplier to the multiplexer MUX and the multiplier MTC, in which the function of the controller CTL described herein may be identical to the controller CTL shown in FIG. 6.

Figure 4:
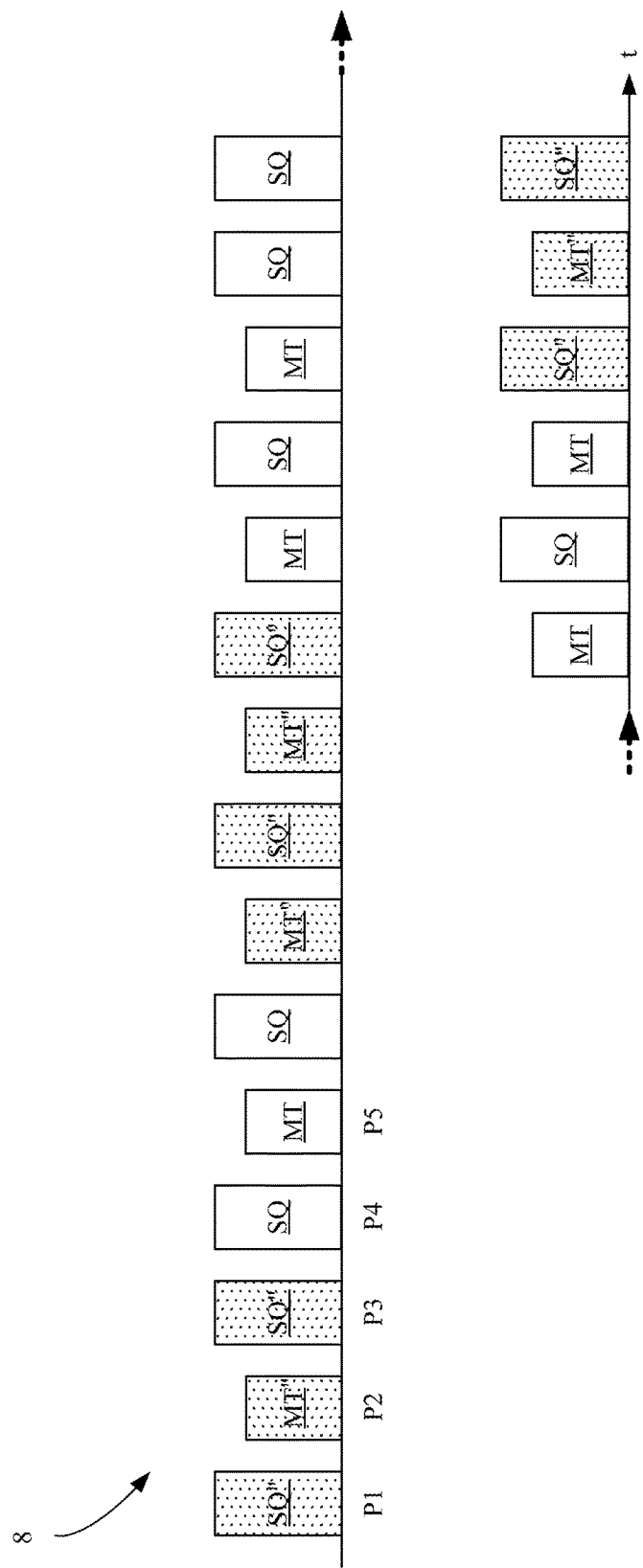
FIG. 4 illustrates an operative example of a decryption method according to one embodiment of the present disclosure.

For example, referring to both FIGS. 4 and 6, in period P1, both the input values of the squarer SQC and the multiplier MTC are N. The multiplexer MUX selects the input value as the multiplexer output according to the control signal CS. The multiplier MTC outputs N^2 as a first output of multiplier. The controller CTL controls the register REG to maintain an original value (e.g., a NULL value), so that the register REG provides the original value to the multiplexer MUX and the multiplier MTC in a next period (e.g., period P2).

In period P2, both the input values of the squarer SQC and the multiplier MTC are still N. The multiplexer MUX selects the encrypted data N as the multiplexer output according to the control signal CS. The multiplier MTC outputs N^2 as a second output of multiplier. The controller CTL controls the register REG to maintain the original value, so that the register REG provides the original value to the multiplexer MUX and the multiplier MTC in a next period.

The operations in period P3 are similar to the operations in period P1, and therefore, a description in this regard is not repeated herein.

In period P4, both the input values of the squarer SQC and the multiplier MTC are still N. The multiplexer MUX selects the input value as the multiplexer output according to the control signal CS. The multiplier MTC outputs N^2 as a fourth output of multiplier. The controller CTL controls the register REG to temporarily store the fourth output of multiplier, so that the register REG provides the fourth output of multiplier to the multiplexer MUX and the multiplier MTC in a next period. The rest may be deduced by analogy.

As a result of the operations described above, it is difficult for an attacker to acquire the operations in the decryption operation performed by the decryption device 100 and the corresponding RSA private key through measuring a relevant signal of the decryption device 100.

Although the present disclosure has been described in considerable detail with reference to certain embodiments thereof, other embodiments are possible. Therefore, the scope of the appended claims should not be limited to the description of the embodiments contained herein.

What is claimed is:

1. A decryption method comprising:
    receiving, by a communication module of a decryption device, encrypted data, wherein the encrypted data is encrypted by an RSA public key;
    performing, by a decryption circuitry of the decryption device, at least one multiplication operation and at least one square operation according to an RSA private key and the encrypted data to acquire decrypted data; and
    performing, by the decryption circuitry, a first false square operation and a first false multiplication operation according to the encrypted data,
    wherein the first false square operation and one of the at least one multiplication operation are performed at the same time, and the first false multiplication operation and one of the at least one square operation are performed at the same time,
    wherein the first false square operation is performed whenever the at least one multiplication operation is performed, and the first false multiplication operation is performed whenever the at least one square operation is performed, such that a signal of the decryption circuitry indicating a process of acquiring the decrypted data is a result of summing a signal indicating the first false square operation and a signal indicating the at least one multiplication operation or a result of summing a signal indicating the first false multiplication operation and a signal indicating the at least one square operation, in order to increase a difficulty for an attack to identify the RSA private key.

2. The decryption method as claimed in claim 1, wherein a calculation result of the first false square operation or a calculation result of the first false multiplication operation is not used in generating the decrypted data.

3. The decryption method as claimed in claim 1, wherein a number of times the first false multiplication operation is performed corresponds to a binary bit length of the RSA private key.

4. The decryption method as claimed in claim 1, wherein a number of times the first false multiplication operation is performed and a number of times the at least one square operation is performed are identical.

5. The decryption method as claimed in claim 1, wherein a binary form of the RSA private key comprises a plurality of bits, and a number of times the first square operation is performed corresponding to a number of "1's" in the binary form of the RSA private key.

6. The decryption method as claimed in claim 1, wherein a number of times the first square operation is performed and a number of times the at least one multiplication operation is performed are identical.

7. The decryption method as claimed in claim 1 further comprising:
    performing at least one second false square operation or at least one second false multiplication operation before or after the at least one multiplication operation or the at least one square operation is performed.

8. The decryption method as claimed in claim 7, wherein the square operation or the second false square operation is performed between two of the at least one second false multiplication operation, between two of the at least one multiplication operation, or between the at least one second false multiplication operation and the at least one multiplication operation.

9. A decryption device comprises:
a communication module; and
a decryption circuitry configured for:
receiving, through the communication module, encrypted data, wherein the encrypted data is encrypted by an RSA public key;
performing at least one multiplication operation and at least one square operation according to an RSA private key and the encrypted data to acquire decrypted data; and
performing a first false square operation and a first false multiplication operation according to the encrypted data,
wherein the first false square operation and one of the at least one multiplication operation are performed at the same time, and the first false multiplication operation and one of the at least one square operation are performed at the same time,
wherein the first false square operation is performed whenever the at least one multiplication operation is performed, and the first false multiplication operation is performed whenever the at least one square operation is performed, such that a signal of the decryption circuitry indicating a process of acquiring the decrypted data is a result of summing a signal indicating the first false square operation and a signal indicating the at least one multiplication operation or a result of summing a signal indicating the first false multiplication operation and a signal indicating the at least one square operation, in order to increase a difficulty for an attack to identify the RSA private key.

10. The decryption device as claimed in claim 9, wherein a calculation result of the first false square operation or a calculation result of the first false multiplication operation is not used in generating the decrypted data.

11. The decryption device as claimed in claim 9, wherein a number of times the first false multiplication operation is performed corresponds to a binary bit length of the RSA private key.

12. The decryption device as claimed in claim 9, wherein a number of times the first false multiplication operation is performed and a number of times the at least one square operation is performed are identical.

13. The decryption device as claimed in claim 9, wherein a binary form of the RSA private key comprises a plurality of bits, and a number of times the first square operation is performed corresponds to a number of "1's" in the binary form of the RSA private key.

14. The decryption device as claimed in claim 9, wherein a number of times the first square operation is performed and a number of times the at least one multiplication operation is performed are identical.

15. The decryption device as claimed in claim 9, wherein the decryption circuitry is further configured for:
performing at least one second false square operation or at least one second false multiplication operation before or after the at least one multiplication operation or the at least one square operation is performed.

16. The decryption device as claimed in claim 15, wherein the square operation or the second false square operation is performed between two of the at least one second false multiplication operation, two of the at least one multiplication operation, or the at least one second false multiplication operation and the at least one multiplication operation.

17. A decryption circuit comprising:
a squarer configured to receive an input value, and perform a square operation to the input value to generate an output of the squarer;
a multiplier configured to receive the input value and encrypted data, and perform a multiplication operation with the input value and the encrypted data to generate an output of multiplier;
a multiplexer configured to receive the output of the squarer and the output of multiplier, and output one of the output of the squarer and the output of multiplier as a multiplexer output according to an RSA private key; and
a register configured to temporarily store the multiplexer output, and provide the multiplexer output to the squarer and the multiplier to serve as a new input value;
wherein the square operation and the multiplication operation are performed simultaneously, the square operation performed by the squarer is a false square operation if the multiplier performs the multiplication operation, and the multiplication operation performed by the multiplier is a false multiplication operation if the squarer performs the square operation,
wherein the false square operation is performed whenever the multiplication operation is performed, and the false multiplication operation is performed whenever the square operation is performed, such that a signal of the decryption circuit indicating a process of processing the encrypted data is a result of summing the output of the squarer indicating the false square operation and the output of the multiplier indicating the multiplication operation or a result of summing the output of the squarer indicating the square operation and the output of the multiplier indicating the false multiplication operation, in order to increase a difficulty for an attack to identify the RSA private key.

18. The decryption circuit as claimed in claim 17, wherein the input value is equal to the encrypted data, and the encrypted data is encrypted by an RSA public key.

19. The decryption circuit as claimed in claim 17 further comprising:
a controller, wherein in a first operating state, when the register receives a new multiplexer output, the controller controls the register to maintain the multiplexer output and provide the multiplexer output to the squarer and the multiplier.

20. The decryption circuit as claimed in claim 19, wherein in a second operating state, when the register receives the new multiplexer output, the controller controls the register to temporarily store the new multiplexer output and provide the new multiplexer output to the squarer and the multiplier.

* * * * *